US010764856B2

(12) United States Patent
Ye et al.

(10) Patent No.: US 10,764,856 B2
(45) Date of Patent: Sep. 1, 2020

(54) UPLINK DATA TRANSMISSION METHOD AND APPARATUS (71) Applicant: NTT DOCOMO, INC., Tokyo (JP)

(72) Inventors: Neng Ye, Beijing (CN); Xiangming Li, Beijing (CN); Anxin Li, Beijing (CN); Xiaohang Chen, Beijing (CN); Qun Zhao, Beijing (CN); Huiling Jiang, Beijing (CN)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 16/323,207

(22) PCT Filed: Jul. 7, 2017

(86) PCT No.: PCT/CN2017/092152
§ 371 (c)(1),
(2) Date: Feb. 4, 2019

(87) PCT Pub. No.: WO2018/024078
PCT Pub. Date: Feb. 8, 2018

(65) Prior Publication Data
US 2019/0215792 A1     Jul. 11, 2019

(30) Foreign Application Priority Data
Aug. 5, 2016   (CN) .......................... 2016 1 0639207

(51) Int. Cl.
H04W 74/08    (2009.01)
H04W 56/00    (2009.01)
(Continued)

(52) U.S. Cl.
CPC ......... H04W 56/0045 (2013.01); H04L 45/20 (2013.01); H04W 24/08 (2013.01);
(Continued)

(58) Field of Classification Search
CPC . H04W 56/0045; H04W 56/00; H04W 76/11; H04W 24/08; H04W 52/0261;
(Continued)

(56) References Cited

U.S. PATENT DOCUMENTS

2011/0182280 A1    7/2011 Charbit et al.
2012/0281531 A1   11/2012 Susitaival
(Continued)

FOREIGN PATENT DOCUMENTS

CN    101646234 A    2/2010
CN    102165840 A    8/2011
(Continued)

OTHER PUBLICATIONS

International Search Report (in English and Chinese) and Written Opinion (in Chinese) issued in PCT/CN2017/092152, dated Sep. 19, 2017; ISA/CN.
(Continued)

Primary Examiner — Mohamed A Kamara
(74) Attorney, Agent, or Firm — Harness, Dickey & Pierce, P.L.C.

(57) ABSTRACT

The present application provides an uplink data transmission method and a user terminal (UE) for executing the method. The method in the present application comprises: A, generating a first random number; B, determining, according to the generated first random number, whether to initiate a random access process; if the random access process is initiated, obtaining a timing advance (TA) value from a base station by means of the random access process; and if the random access process is not initiated, listening for a TA message broadcast by another UE and obtaining a TA value from the TA message; C, transmitting uplink data according to the obtained TA value; D, if the uplink data is successfully transmitted, continuing to perform E, and if the uplink data (Continued)

is unsuccessfully transmitted, returning to A; and E, generating a TA message according to the obtained TA value, and broadcasting the generated TA message. By means of the method in the present application, the time delay and the power consumption can be reduced.

20 Claims, 2 Drawing Sheets

(51) Int. Cl.
  *H04W 76/11* (2018.01)
  *H04L 12/733* (2013.01)
  *H04W 24/08* (2009.01)
  *H04W 52/02* (2009.01)

(52) U.S. Cl.
  CPC ....... *H04W 52/0261* (2013.01); *H04W 56/00* (2013.01); *H04W 56/002* (2013.01); *H04W 74/0833* (2013.01); *H04W 76/11* (2018.02)

(58) Field of Classification Search
  CPC ........... H04W 56/002; H04W 74/0833; H04W 74/00; H04L 45/20
  See application file for complete search history.

(56) References Cited

U.S. PATENT DOCUMENTS

| | | | |
|---|---|---|---|
| 2012/0314652 A1* | 12/2012 | Ahn | H04W 74/085 370/328 |
| 2014/0029575 A1* | 1/2014 | Zeng | H04W 72/0446 370/331 |
| 2014/0341208 A1 | 11/2014 | Charbit et al. | |
| 2016/0183212 A1 | 6/2016 | Suzuki et al. | |
| 2019/0215789 A1* | 7/2019 | Parkvall | H04W 56/001 |

FOREIGN PATENT DOCUMENTS

| | | |
|---|---|---|
| CN | 103491622 A | 1/2014 |
| CN | 105453627 A | 3/2016 |
| EP | 2408253 A1 | 1/2012 |
| EP | 2983425 A1 | 2/2016 |

OTHER PUBLICATIONS

Extended European Search Report from counterpart EP178362604, dated Feb. 7, 2020.
International Preliminary Report on Patentability from counterpart PCT/CN2017/092152, including the English translation of the Written Opinion, dated Feb. 5, 2019.

* cited by examiner

UPLINK DATA TRANSMISSION METHOD AND APPARATUS

CROSS-REFERENCE TO RELATED APPLICATIONS

This application is a 371 U.S. National Stage of International Application No. PCT/CN2017/092152, filed on Jul. 7, 2017, which claims priority to Chinese Application No. 201610639207.2, filed on Aug. 5, 2016. The entire disclosures of the above applications are incorporated herein by reference.

FIELD

The present application relates to a wireless communication system, and particularly, to an uplink data transmission method and apparatus in a wireless communication system.

BACKGROUND

Currently, with the rapid developments in the fourth generation mobile communication (4G) technology, development work for the fifth generation mobile communication (5G) standards is underway. According to the International Telecommunication Union (ITU), 5G technology is applicable to three typical application scenarios. The first application scenario is the enhanced mobile broadband (eMBB). In this scenario, the peak data rate of Internet access of an intelligent terminal can reach 10 Gbps or even 20 Gbps, which can support developments in bandwidth-consuming applications, such as virtual reality, live video broadcasting and sharing, cloud access anytime and anywhere, etc.. The second application scenario is the massive machine type communication (mMTC), which requires the 5G network to support connections with 1 million people and things per square kilometers. The third application scenario is the ultra-reliable and low-latency communication (uRLLC), which requires the 5G network to restrict the delay within millisecond to promote low-latency services such as intelligent manufacturing, remote mechanical control, assisted driving and automatic driving, or the like.

As stated above, in the mMTC application scenario, the number of connections with people and things supported by the 5G network may reach 1 million/square kilometers. With the massive terminals requiring network access, uplink traffic in the 5G network may increase greatly. Correspondingly, signaling overheads for uplink scheduling at 5G base stations may also increase drastically. Therefore, how to perform uplink data transmission in the 5G network becomes one of current research hotspots.

SUMMARY

Various embodiments of the present application provide an uplink data transmission method. The method may include:

A, generating a first random number;
B, determining whether to initiate a random access process according to the first random number; obtaining a timing advance (TA) value from a base station through a random access process when it is determined the random access process is to be initiated; monitoring a TA message broadcast by another user terminal (UE) and obtaining a TA value from the TA message when it is determined the random access process is not to be initiated;
C, performing uplink data transmission according to the TA value;
D, performing E when the uplink data transmission is successful; returning to A when the uplink data transmission is unsuccessful; and
E, generating a TA message using the TA value, and broadcasting the generated TA message.

Various embodiments of the present application also provide a user terminal (UE). The UE may include:
a first random number generating module, configured to generate a first random number;
a TA obtaining module, configured to determine whether to perform a random access process according to the first random number; obtain a TA value from an eNB through a random access process when it is determined the random access process is to be initiated; and monitor a TA message broadcast by another UE and obtain a TA value from the TA message when it is determined the random access process is not to be initiated;
a data transmitting module, configured to perform uplink data transmission using the TA value;
a TA message generating module, configured to generate a TA message using the TA value; and
a broadcasting module, configured to broadcast the generated TA message.

Various embodiments of the present application also provide a non-transitory computer readable storage medium. The storage medium stores machine readable instructions executable by a processor to:

A, generate a first random number;
B, determine whether to initiate a random access process according to the first random number; obtain a TA value from a base station through a random access process when it is determined the random access process is to be initiated; monitor a TA message broadcast by another UE and obtain a TA value from the TA message when it is determined the random access process is not to be initiated;
C, perform uplink data transmission according to the TA value;
D, perform E when the uplink data transmission is successful; return to A when the uplink data transmission is unsuccessful; and
E, generate a TA message using the TA value, and broadcast the generated TA message.

It can be seen from the foregoing technical schemes that the uplink data transmission method of various embodiments of the present application does not require all of UEs to perform random access. In this method, some UEs obtain a TA value through random access, and some UEs obtain a TA value from a TA message broadcast by another UE. Since not all of the UEs perform the random access, the access delay, the signaling overheads and the power consumptions resulted from collisions of the UEs during random access can be greatly reduced, and good uplink access performances can be attained yen in the mMTC application scenario of the 5G network.

EMBODIMENTS

As stated above, in the mMTC application scenario, uplink traffic of the 5G network may increase greatly. Correspondingly, signaling overheads for uplink scheduling at base stations may also increase drastically. Therefore, how to perform uplink data transmission in a 5G network is one of current research hotspots.

In a Long Term Evolution (LTE) system, a base station (eNB) needs to perform the following signaling interactions when establishing a connection with a user terminal (UE).

First, the UE may initiate a random access process using a random access channel (RACH), and send a random access request to the eNB.

Afterwards, when decoding the random access request of the UE, the eNB may calculate a transmission delay of the UE signal, thus can acquire the distance between the UE and the eNB, thereby determine a timing advance (TA) used for transmitting a data signal by the UE. Then, the eNB may notify the UE of the TA value through an access grant channel (AGCH).

Thereafter, the UE may advance signal transmission on a traffic channel (TCH) by the TA value to implement uplink synchronization of transmitted signals of different UEs at the eNB.

It can be seen from the above random access process that, in a conventional LTE system, the UE may obtain the TA only through a random access process. When the method is applied in the mMTC application scenario of the 5G network to have all of users perform the random access process, there may be frequent collisions between random access processes of different users due to the large user base, which may cause huge access delay and excessive power consumption at UEs and place a huge burden on the 5G network.

To address the problem, various embodiments of the present application provide an uplink data transmission method. According to the method, not all of UEs are required to perform random access, and some of the UEs can obtain a TA value from another UE. As such, uplink synchronization of transmitted signals of different UEs at the eNB can still be achieved while collisions of random access processes of UEs, delay and power consumptions of the random access process can be reduced. Therefore, the technical scheme is particularly applicable to the mMTC application scenario of the 5G network.

Figure 1:
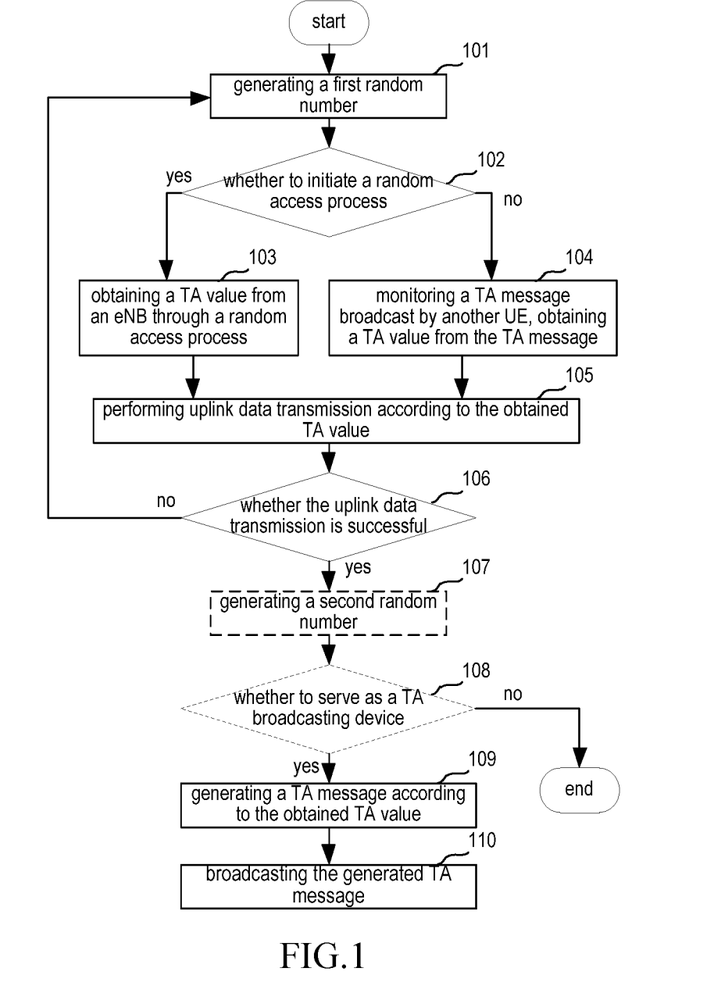
FIG. 1 is a flowchart illustrating an uplink data transmission method according to an embodiment of the present application.

Specifically, FIG. 1 is a flowchart illustrating an uplink data transmission method according to an embodiment of the present application.

As shown in FIG. 1, the uplink data transmission method in the embodiment of the present application may include the following procedures.

At 101, a first random number may be generated before a random access process is performed.

In various embodiments, a random number generator may be maintained in a UE. Therefore, in this step, the UE may generate the first random number using the random number generator.

At 102, it may be determined whether a random access process is to be initiated according to the first random number, the procedure in 103 may be performed when it is determined the random access process is to be initiated; and the procedure in 104 may be performed when it is determined the random access process is not to be initiated.

In this step, the generated first random number may be compared with a first threshold stored in a device executing the method, and it may be determined whether the first random number is smaller than the first threshold. When it is determined the first random number is smaller than the first threshold, it may be determined the random access process is to be initiated. When it is determined the first random number is larger than or equal to the first threshold, it may be determined the random access process is not to be initiated.

It should be noted that, the foregoing condition, i.e., determining to perform the random access process when it is determined the first random number is smaller than the first threshold, is merely an example. In various embodiments of the present application, other conditions of determining to perform random access may be used. For example, it may be configured that the random access process is performed when it is determined the first random number is larger than the first threshold. These conditions are not for limiting the protection scope of the present application.

In embodiments of the present application, the first threshold may be predetermined and stored in the UE. In addition, the first threshold may also be sent by an eNB to each UE, for example, via broadcasting to the UEs.

Moreover, in various embodiments, different first thresholds may be configured for different UEs to make different types of UEs having different probabilities of performing the random access process, thereby implementing precise control of random access processes. For example, a relatively higher first threshold may be configured for a UE capable of transmitting a broadcast message as a relay node and willing to broadcast messages (for example, a head device of an MTC cluster), so as to increase the probability of the UE performing a random access process; a relatively lower first threshold may be configured for a UE incapable of transmitting a broadcast message as a relay node, so as to reduce the probability of the UE performing a random access process, or the like.

At 103, a TA value may be obtained from an eNB through a random access process, and the procedure in 105 may be performed.

At 104, a TA message broadcast by another UE may be monitored, a TA value may be obtained from the TA message, and the procedure in 105 may be performed.

Figure 2:
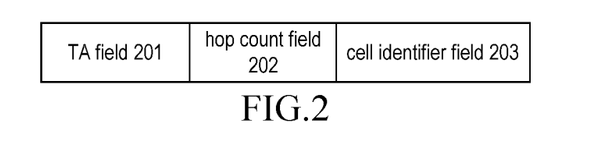
FIG. 2 is a schematic diagram illustrating a TA message according to an embodiment of the present application.

In various embodiments, the TA message may have a structure as shown in FIG. 2. The TA message may include: a TA field 201 for bearing a TA value, and a hop count field 202 for bearing a TA hop count. The TA message may also include a cell identifier field 203 for bearing a cell identifier. The TA hop count represents the total number of UEs traversed by the TA value in the TA message from the eNB to the UE that receives the TA message. The TA hop count is mainly used for controlling the accuracy of the TA, preventing the TA being inaccurate and cannot meet the system requirements for delay after being forwarded for multiple times.

In this step, the UE may set up a time window T, and if a TA message is received from another UE within the time window T, the TA value may be obtained from the received TA message; if no TA message is received from another UE within the time window T, the procedure in 101 may be performed to re-determine whether a random access process is to be initiated. The time window T may be configured by taking the system requirements for delay into consideration, so as to prevent a TA value being received too late by the UE.

Specifically, when a TA message is received within the time window T by the UE from another UE and only one TA message is received, the TA value may be directly obtained from the TA field 201 of the TA message. When a plurality of TA messages are received within the time window T, the TA hop count in the hop count field 202 of each TA message may be checked to identify a TA message with the smallest hop count. When only one TA message includes the smallest TA hop count, the TA value may be directly obtained from the TA field 201 of the TA message. When a plurality of TA messages include the smallest TA hop count, it may be further determined whether the cell identifiers included in cell identifier fields 203 of the TA messages are the same. When it is determined the cell identifiers are the same, the TA values included in the TA fields 201 of the TA messages are linearly combined, and the TA value of the device executing the method may be determined according to the combined TA value. When it is determined the cell identifiers are not the same, a TA message corresponding to a cell with the maximum receiving power strength or a TA message corresponding to a serving cell of the device executing the method may be identified from the TA messages, and the TA value of the device executing the method may be determined according to the identified TA message.

At 105, uplink data transmission may be performed according to the TA value.

At 106, it may be determined whether the uplink data transmission is successful.

When it is determined the uplink data transmission is successful, the procedure in 107 may be performed.

When it is determined the uplink data transmission is unsuccessful, the procedure in 101 may be performed to re-determine whether the random access process is to be initiated.

In this step, the UE may determine whether the uplink data transmission is successful based on an acknowledgement returned by the eNB, e.g., an ACK/NACK. When uplink data is successfully transmitted while the number of retransmissions is within a pre-determined number limit set in the system, it may still be determined that the uplink data transmission is successful. When the uplink data has not been successfully transmitted and the number of retransmissions reaches the pre-determined number limit set in the system, it may be determined that the uplink data transmission is unsuccessful, and the procedure in 101 may be performed to re-determine whether the random access process is to be initiated.

At 107, a second random number may be generated.

In this step, the UE may generate the second random number using a random number generator maintained by the UE.

At 108, it may be determined whether the device executing the method may serve as a TA broadcasting device according to the second random number, the procedure in 109 may be performed when it is determined the device executing the method may serve as a TA broadcasting device, or the process may be terminated to make the device executing the method enter a sleeping mode when it is determined the device executing the method may not serve as a TA broadcasting device.

In this step, the second random number may be compared with a second threshold stored in the device executing the method, and it may be determined whether the second random number is smaller than the second threshold. When it is determined the second random number is smaller than the second threshold, it may be determined that the device executing the method may serve as a TA broadcasting device. When it is determined the second random number is larger than or equal to the second threshold, it may be determined that the device executing the method may not serve as a TA broadcasting device.

It should be noted that the above judging criterion, i.e., the device executing the method may serve as a TA broadcasting device when it is determined the second random number is smaller than the second threshold, is merely an example. In various embodiments, other judging criteria may be used for determining whether the device executing the method may serve as the TA broadcasting device. For example, it may be pre-configured that the device executing the method may serve as a TA broadcasting device when it is determined the second random number is larger than the second threshold, and may not serve as a TA broadcasting device when it is determined the second random number is smaller than or equal to the second threshold. Similarly, the judging criteria are not intended for limiting the protection scope of the present application.

In various embodiments, the second threshold may be predetermined and stored in the UE. The second threshold may also be sent by the eNB to each UE, for example, via broadcasting to the UEs.

In various embodiments, different second thresholds may be configured for different UEs. For example, a relatively higher second threshold may be configured for a UE capable of and willing to perform TA broadcasting (e.g., a UE capable of and willing to serve as a TA broadcasting device), thereby increasing the probability of the UE performing TA broadcasting as a TA broadcasting device. For a UE incapable of sending a broadcast message as a TA broadcasting device, the second threshold may be configured to be 0, thereby preventing the UE from serving as a TA broadcasting device.

At 109, a TA message may be generated using the TA value obtained.

In this step, the UE may generate the TA message as shown in FIG. 2 according to the obtained TA value. The generating process may include: adding the obtained TA value into the TA field 201, generating and adding a TA hop count into the hop count field 202. When it is determined the TA message includes a cell identifier field, the UE may also add the identifier of the cell where the UE resides into the cell identifier field 203.

The method of generating the TA hop count by the UE may include: when the TA value is obtained from the eNB through a random access process, the TA hop count may be generated to be 0; when the TA value is obtained from a TA message broadcast by another UE, the TA hop count may be generated to be equal to the sum of 1 and the TA hop count included in the hop count field 202 of the received TA message. That is, the value of the TA hop count in the received TA message may be increased by 1, indicating the TA value is forwarded one more time at the UE.

At 110, the generated TA message may be broadcasted.

In this step, the UE may broadcast the generated TA message through a LTE Sidelink. Specifically, a physical sidelink shared channel (PSSCH) may be used for transmitting the generated TA message.

In various embodiments, the UE may broadcast the generated TA message for multiple times. For example, when a maximum number of broadcast times, denoted by B, or a broadcast time window having a time length denoted by Tb is configured in the UE, the UE may repeat the procedure in 110 for B times or within the time window Tb before the process is terminated and the UE enters a sleeping mode.

Moreover, in this step, the power at which the UE broadcasts the TA message is limited by the maximum broadcasting power of the UE and the time length Tb of the broadcast time window.

In addition, in order to avoid excessive deviation of the TA value caused by too many times of forwarding, before the procedure in 109 is performed, a determining procedure may be performed.

At 109A, when it is determined the TA value is obtained from a TA message of another UE and the TA hop count included in the hop count field 202 of the TA message is greater than or equal to a predetermined third threshold, the process may be terminated, and the UE may enter the sleeping mode without generating and broadcasting the TA message; when it is determined the TA is obtained from a TA message of another UE and the TA hop count is smaller than the predetermined third threshold, the procedure in 109 may be performed.

The third threshold may be predetermined and stored in the UE, or may be sent by the eNB to the UE, e.g., via broadcasting to the UEs. The third threshold may be determined with both the accuracy of the TA value and the number of TA messages broadcast in the entire cell taken into consideration. By setting an appropriate third threshold, the access delay of the UEs can be reduced while the access probability of the UEs can be increased. For example, when the power at which the UE broadcasts the TA message is P, the distance d from a device that sends the TA message to a device that receives the TA message can be obtained, and the delay Td of a signal propagated over the distance d can also be determined. The product of multiplying Td and the third threshold may be less than the maximum tolerable uplink delay.

It can be seen from the above method that, the uplink data transmission method of various embodiments does not require all UEs to perform random access. According to the method, some UEs obtain a TA value through a random access process, and some UEs obtain a TA value from a TA message broadcast by another UE. Since not all of the UEs perform the random access process, the access delay, the signaling overheads, and the power consumption resulted from collisions of the random access processes performed by the UEs can be greatly reduced. The method can generate good uplink access performances even in the mMTC application scenario of the 5G network.

As an alternative to the foregoing solution, in various embodiments of the present application, an eNB may specify whether a UE is to perform a random access process. For example, the eNB may provide an identifier of a UE which is allowed to perform a random access process, or the like. In such case, when a UE is specified to be allowed to perform a random access process, the UE may skip the procedures of generating the first random number and determining according to the first random number (i.e., the procedures in 101 and 102 may not be performed), and directly perform the random access process to obtain the TA value (i.e., the procedure in 103). When a UE is not specified to be allowed to perform a random access process, the UE may obtain the TA value from a TA message broadcast by another UE (i.e., the procedure in step 104).

According to some other embodiments, the system may preconfigure that some UEs may not perform the procedures of generating the first random number and determining whether to perform the random access process according to the first random number, and can directly perform the random access process. For example, a head user system in an MTC cluster may be pre-configured to be allowed to perform a random access process.

In addition, as a simplified alternative to the foregoing solution, after successfully transmitting the uplink data, the UE may skip the procedures of generating a second random number and determining whether to serve as a TA broadcasting device according to the second random number (i.e., the procedures in 107 and 108 may not be performed), and perform the procedures of generating and broadcasting the TA message (i.e., the procedures in 109 and 110). As such, it is configured that all of UEs that have successfully transmitted uplink data may broadcast TA messages to other UEs. The previous solutions are more flexible and controllable than the simplified solution, can avoid congestion at the frequency of the LTE Sidelink and excessive power consumptions, and are more suitable for scenarios with relatively denser users which require a TA. In scenarios with relatively denser users that require a TA, not many UE are required to serve as the TA broadcasting device, and broadcasting from only a small number of UEs can make most UEs obtain the TA value.

Figure 3:
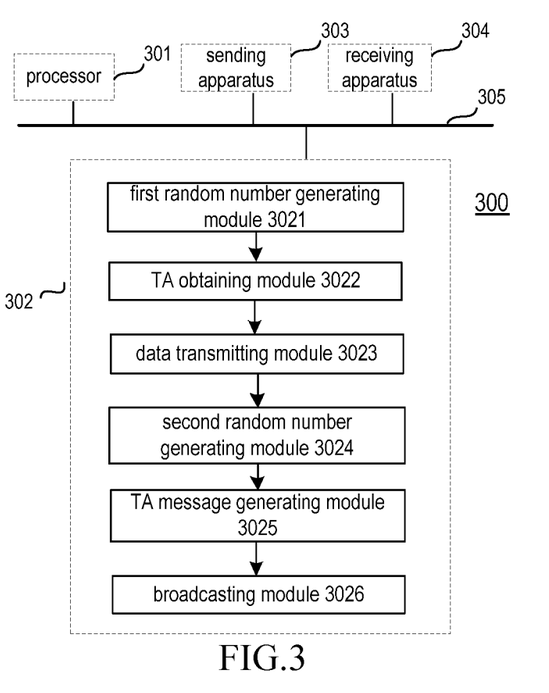
FIG. 3 is a schematic diagram illustrating the inner structure of a UE according to an embodiment of the present application.

Corresponding to the above uplink data transmission methods, various embodiments of the present application also provide a UE capable of implementing the above methods. FIG. 3 is a schematic diagram illustrating an inner structure of UE 300 according to an embodiment of the present application.

As shown in FIG. 3, the UE 300 may include: a processor 301, a memory 302, a sending apparatus 303, and a receiving apparatus 304. The processor 301, the memory 302, the sending apparatus 303, and the receiving apparatus 304 communicate with each other through a connecting unit 305. The processor 301 may execute the following instruction modules stored in memory 302:

a first random number generating module 3021, for generating a first random number;

a TA obtaining module 3022, for determining whether to perform a random access process according to the first random number; obtaining a TA value from an eNB through a random access process using the receiving apparatus 304 when it is determined the random access process is to be performed; monitoring a TA message broadcast by another UE using the receiving apparatus 304 and obtaining a TA value from the TA message when it is determined the random access process is not to be performed;

a data transmitting module 3023, for performing uplink data transmission according to the TA value using the sending apparatus 303;

a second random number generating module 3024, for generating a second random number;

a TA message generating module 3025, for determining whether the UE is to serve as a TA broadcasting device according to the second random number, and generating a TA message according to the TA value when it is determined the UE is to serve as a TA broadcasting device; and a broadcasting module 3026, for broadcasting the generated TA message using the sending apparatus 303.

The UE may also include: a first storage module for storing a first threshold. In this case, the TA obtaining module 3022 may compare the first random number with the first threshold stored in the storage module, and determine whether the first random number is smaller than the first threshold, initiate the random access process when it is determined the first random number is smaller than the first threshold; and do not initiate the random access process when it is determined the first random number is larger than or equal to the first threshold.

The UE may also include: a first storage module for storing a first threshold. In this case, the TA obtaining module 3022 may compare the first random number with the first threshold stored in the first storage module, and determine whether the first random number is smaller than the first threshold, initiate the random access process when it is determined the first random number is smaller than the first threshold; and do not initiate the random access process when it is determined the first random number is larger than or equal to the first threshold.

As stated above, the TA message may include: a TA field, a hop count field, and a cell identifier field. In this case, the TA message generating module 3025 may add the obtained TA value into the TA field of the TA message; generate a TA hop count, and add the TA hop count into the hop count field of the TA message; and add the identifier of the cell where the UE resides into the cell identifier field of the TA message.

In addition, the broadcasting module 3026 may repeatedly broadcast the generated TA message within a time length of a configured broadcast time window.

In addition, before generating the TA message, the TA message generating module 3025 may further determine: to terminate the process and not to generate the TA message when the TA value is obtained from a TA message of another UE and the TA hop count in the TA message is larger than or equal to a predetermined third threshold.

As stated above, as an alternative simplified solution, the UE may not include the second random number generating module 3024 described above. In this case, the TA message generating module 3025 does not need to make any judgment, and can directly generate a TA message according to the obtained TA value.

It can be seen from the above UE device that, the UE of various embodiments does not necessarily execute a random access process. The TA value may be obtained from an eNB through a random access process, or from a TA message broadcast by another other UE. As such, the access delay, the signaling overheads, and the power consumption resulted from collisions of random access processes of UEs can be greatly reduced. Therefore, the UE can generate good uplink access performances even in the mMTC application scenario of the 5G network.

In the above, the hardware structure of the UE 300 may include one or multiple components as shown in the figure, or may not include some of the components.

For example, only one processor 301 is shown in the figure, but there may be a plurality of processors. In addition, the processing may be performed by one processor, or may be performed by one or multiple processors simultaneously, sequentially, or according to other methods. In addition, the processor 301 may be deployed in a plurality of chips.

The memory 302 is a computer readable storage medium, and may include, for example, at least one of a read only memory (ROM), an erasable programmable ROM (EPROM), an electrically EPROM (EEPROM), a random access memory (RAM), or other proper storage medium. The memories 302 may also be referred to as registers, caches, main memories (primary storage apparatuses), or the like. The memories 302 may respectively store executable programs (program codes), software modules, or the like for implementing the uplink data transmission method of various embodiments of the present application. In addition, the UE 300 may include hardware such as a microprocessor, a digital signal processor (DSP), an application specific integrated circuit (ASIC), a programmable logic device (PLD), and a field programmable gate array (FPGA), or the like. Some or all of the functional blocks may be implemented by the hardware. For example, the processor 301 may be deployed in at least one of hardware components.

In addition, the terms described in the specification and/or the terms required for understanding the specification may be replaced with terms having the same or similar meanings. For example, the channel and/or symbol may also be a signal (or signaling). In addition, the signal may also be a message.

In addition, the information, parameters, and the like described in the specification may be indicated by absolute values, may be indicated by values relative to specified values, or may be indicated by other corresponding information. For example, wireless resources may be indicated by a specified index. Further, the formula or the like using these parameters may also be different from those explicitly disclosed in the specification.

The information, signals, or the like described in the specification may be represented using any of a variety of different technologies. For example, data, commands, instructions, information, signals, bits, symbols, chips, and the like that may be mentioned in all of the above descriptions may be indicated by voltages, currents, electromagnetic waves, magnetic fields or magnetic particles, light fields or photons, or any combination thereof.

In addition, information, signals, and the like may be output from the upper layer to the lower layer, and/or from the lower layer to the upper layer. Information, signals, and the like may be input or output via a plurality of network nodes.

Input or output information, signals, and the like may be stored in a specific place (such as a memory) or may be managed by a management table. Input or output information, signals, and the like may be overwritten, updated or supplemented. The output information, signals, or the like may be deleted. The input information, signals, or the like may be sent to other apparatuses.

The notification of the information is not limited to the manners/implementations described in the specification, and may also be performed by other methods. For example, the notification of the information may be implemented through physical layer signaling (for example, downlink control information (DCI), uplink control information (UCI), upper layer signaling (for example, radio resource control (RRC) signaling, broadcast information (master information block (MIB), system information block (SIB), and the like), and media access control (MAC) signaling), other signals, or a combination thereof.

In addition, the physical layer signaling may also be referred to as L1/L2 (Layer 1/Layer 2) control information (L1/L2 control signal), L1 control information (L1 control signal), and the like. In addition, the RRC signaling may also be referred to as an RRC message, and may be, for example, an RRC Connection Setup message, an RRC Connection Reconfiguration message, or the like. Furthermore, the MAC signaling may be notified, for example, by the MAC control element (MAC CE).

In addition, the notification of specified information (for example, the notification of "X") is not limited to being explicitly performed, and may be performed implicitly (for example, by not notifying the specified information or by notifying other information).

The judgment may be performed by a value (0 or 1) represented by 1 bit, or by a true or false value (boolean value) represented by true (true) or false (false), and may also be performed by means of value comparison (for example, comparison with a specified value).

Software, whether referred to as software, firmware, middleware, microcode, hardware description language, or other names, should be interpreted broadly to mean commands, command sets, code, code segments, program code, programs, sub programs, software modules, applications, software applications, software packages, routines, subroutines, objects, executable files, threads of execution, steps, functions, and the like.

In addition, software, commands, information, and the like may be sent or received via a transmission medium. For example, when software is sent from a website, a server, or another remote resource by using wired technologies (coaxial cable, optical cable, twisted pair, digital subscriber line (DSL), and the like) and/or wireless technologies (infrared, microwave, and the like), these wired technologies and/or wireless technologies are included within the definition of the transmission medium.

Terms such as "system" and "network" used in the specification are used interchangeably.

In the specification, terms such as "base station (BS)", "wireless base station", "eNB", "gNB", "cell", "sector", "cell group", "carrier", and "component carrier" can be used interchangeably. The base station is sometimes referred to as a fixed station, a NodeB, an eNodeB (eNB), an access point, a sending point, a receiving point, a femtocell, a small cell, and the like.

A base station can accommodate one or more (for example, three) cells (also referred to as sectors). When it is determined the base station accommodates a plurality of cells, the entire coverage area of the base station may be divided into a plurality of smaller areas, and each smaller area may also provide a communication service by using a base station subsystem (for example, an indoor small cell (remote radio head (RRH)). The term "cell" or "sector" refers to a part or the entirety of the coverage area of a base station and/or base station subsystem that performs communication services in the coverage.

In the specification, terms such as "mobile station (MS)", "user terminal", "user equipment (UE)", and "terminal" are used interchangeably. The base station is sometimes referred to as a fixed station, a NodeB, an eNodeB (eNB), an access point, a sending point, a receiving point, a femtocell, a small cell, and the like.

Mobile stations are also sometimes referred to as subscriber stations, mobile units, subscriber units, wireless units, remote units, mobile devices, wireless devices, wireless communication devices, remote devices, mobile subscriber stations, access terminals, mobile terminals, wireless terminals, remote terminals, handsets, user agents, mobile clients, clients, or several other appropriate terms by those skilled in the art.

In addition, the wireless base station in the specification may also be replaced with a user terminal. For example, each manner/implementation of the present invention may also be applied to a configuration in which communication between a wireless base station and a user terminal is replaced with communication between a plurality of user terminals (device to device (D2D)). In this case, the function of the foregoing eNB may be regarded as the function of the UE 300. In addition, words such as "uplink" and "downlink" may also be replaced with "side". For example, the uplink channel may also be replaced with a side channel.

Similarly, the user terminal in the specification may also be replaced with a wireless base station. In this case, the function of the foregoing UE 300 may be regarded as the function of the eNB.

In the specification, it is set that a specific action performed by the base station is also performed by an upper node thereof depending on the situation. Obviously, in a network composed of one or more network nodes having a base station, various actions performed for communication with the terminal may be performed through the base station, more than one network nodes other than the base station (for example, a mobile management entity (MME), a serving-gateway (S-GW), and the like may be considered, but the present application is not limited thereto), or a combination thereof.

The manners/implementations described in the specification may be used separately or in combination, or may be switched for use in the execution process. In addition, the sequence of processing steps, sequences, flowcharts, and the like of the manners/implementations described in the specification can be changed as long as there is no contradiction. For example, with regard to the method described in the specification, various step units are provided in an exemplified sequence, and the method is not limited to the provided specific sequence.

The manners/implementations described in the specification may be applied to systems that use Long Term Evolution (LTE), LTE-Advanced (LTE-A), LTE-Beyond (LTE-B), super 3rd generation mobile communication system (SUPER 3G), Advanced International Mobile Telecommunications (IMT-Advanced), 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trademark), code division multiple access 2000 (CDMA 2000), ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate wireless communication methods and/or next generation systems that are extended based on them.

The term "according to" used in the specification does not mean "only according to" unless it is clearly stated in other paragraphs. In other words, the term "according to" means both "only according to" and "at least according to".

The term "determining" used in the specification sometimes includes various actions. For example, regarding "determining", calculating, computing, processing, deriving, investigating, and looking up (for example, search in tables, databases, or other data structures), ascertaining, and the like are considered as performing "determining". In addition, regarding "determining", receiving (for example, receiving information), transmitting (for example, transmitting information), input, output, accessing (for example, accessing data in a memory) and the like may also be considered as performing "determining". In addition, regarding "determining", resolving, selecting, choosing, establishing, comparing, and the like may also be considered as performing "determining". That is, regarding "determining", several actions may be regarded as performing "determining".

The terms "connected" and "coupled" used in the specification, or any variant thereof, mean any direct or indirect connection or coupling between two or more units. The following case may be included: there are one or more intermediate units between two units that are "connected" or "coupled" to each other. The coupling or connection between the units may be physical, logical, or a combination of the two. For example, "connection" may also be replaced with "access". When used in the specification, it may be considered that two units are electrically connected by using one or more wires, cables, and/or printing, and as several non-limiting and non-exhaustive examples, the units are "connected" or "coupled" to each other by using electromagnetic energy having wavelengths of a radio frequency area, a microwave area, and/or a light (both visible light and invisible light) area, and the like.

When it is determined the terms "including", "comprising", and variants thereof are used in the specification or the claims, these terms as also open like the term "having". Further, the term "or" used in the specification or the claims is not an exclusive or.

The above descriptions are only preferred embodiments of the present application, and are not intended to limit the present application. Any modification, equivalent substitution, improvement, and the like that are made within the spirit and principle of the present application should fall within the protection scope of the present application.

The invention claimed is:

1. An uplink data transmission method, comprising:
A, generating a first random number;
B, determining whether to initiate a random access process according to the first random number, obtaining a timing advance (TA) value from a base station through a random access process when it is determined the random access process is to be initiated, and monitoring a TA message broadcast by another user terminal (UE) and obtaining a TA value from the TA message when it is determined the random access process is not to be initiated;
C, performing uplink data transmission according to the TA value obtained;
D, performing E when it is determined the uplink data transmission is successful;
returning to A when it is determined the uplink data transmission is unsuccessful; and
E, generating a TA message according to the TA value, and broadcasting the generated TA message.

2. The method according to claim 1, wherein determining whether to initiate a random access process according to the first random number comprises:
comparing the first random number with a first threshold stored in a device executing the method, and determining whether the first random number is smaller than the first threshold; initiating the random access process when it is determined the first random number is smaller than the first threshold; and not initiating the random access process when it is determined the first random number is larger than or equal to the first threshold.

3. The method according to claim 2, wherein the first threshold is predetermined or is received from the base station.

4. The method according to claim 1, further comprising: before E is performed,
generating a second random number, determining whether a device executing the method is to serve as a TA broadcasting device according to the second random number, performing E when it is determined the device executing the method is to serve as the TA broadcasting device; and terminating the process when it is determined the device executing the method is not to serve as the TA broadcasting device.

5. The method according to claim 4, wherein determining whether the device executing the method is to serve as the TA broadcasting device according to the second random number comprises:
comparing the second random number with a second threshold stored in the device executing the method, and determining whether the second random number is smaller than the second threshold; and determining the device executing the method is to serve as the TA broadcasting device when it is determined the second random number is smaller than the second threshold.

6. The method according to claim 5, wherein the second threshold is predetermined, or is received from the base station.

7. The method according to claim 1, wherein the TA message comprises: a TA field, a hop count field, and a cell identifier field;
wherein generating the TA message according to the TA value comprises:
adding the TA value into the TA field of the generated TA message;
generating a TA hop count, and adding the TA hop count into the hop count field of the generated TA message; and
adding, into the cell identifier field of the generated TA message, an identifier of a cell where a device executing the method resides.

8. The method according to claim 7, wherein generating the TA hop count comprises:
generating the TA hop count which is 0 when it is determined the TA value is obtained from the base station through the random access process; and
generating the TA hop count which equals a sum of 1 and a TA hop count in a hop count field of the TA message received when it is determined the TA value is obtained from the TA message broadcast by another UE.

9. The method according to claim 1, wherein broadcasting the generated TA message comprises: broadcasting the generated TA message via a LTE Sidelink.

10. The method according to claim 1, wherein monitoring the TA message broadcast by another UE and obtaining the TA value from the TA message comprises:
configuring a time window T, and obtaining the TA value from the TA message received from another UE when it is determined the TA message is received within the time window T.

11. The method according to claim 10, wherein the TA message comprises: a TA field, a hop count field, and a cell identifier field; and
wherein obtaining the TA value from the TA message received comprises:
obtaining the TA value from the TA message when only one TA message is received;
checking a TA hop count in each TA message to determine a TA message including a smallest hop count when a plurality of TA messages are received;
obtaining the TA value from the TA message when it is determined there is only one TA message including the smallest TA hop count;
determining whether cell identifiers included in TA messages including the smallest TA hop count are the same when it is determined there are a plurality of TA messages including the smallest TA hop count;
linearly combining TA values included in the TA messages including the smallest TA hop count, and determining the TA value of a device executing the method according to a combined TA value when it is determined the TA messages including the smallest TA hop count include the same cell identifier; and determining a TA message corresponding to a cell having a maximum receiving power strength or a serving cell of the device executing the method, and determining the TA value of the device executing the method according to the determined TA message when the TA messages having the smallest TA hop count do not include the same cell identifier.

12. The method according to claim 1, further comprising: repeatedly broadcasting the generated TA message within a broadcast time window having a preconfigured time length.

13. The method according to claim 1, wherein the TA message comprises: a hop count field;

before the TA message is generated, the method further comprises: terminating executing the method when it is determined the TA value is obtained from a TA message received from another UE and the received TA message includes a TA hop count larger than or equal to a predetermined third threshold.

14. A user terminal (UE), comprising:

at least one processor; and a memory storing computer-readable instructions executable by the at least one processor to:

generate a first random number;

determine whether to perform a random access process according to the first random number; obtain a TA value from an eNB through a random access process when it is determined the random access process is to be performed; and monitor a TA message broadcast by another UE and obtain a TA value from the TA message when it is determined the random access process is not to be performed;

perform uplink data transmission according to the TA value;

generate a TA message according to the TA value; and broadcast the generated TA message.

15. The UE according to claim 14, wherein the instructions are executable by the at least one processor to:

store a first threshold;

compare the first random number with the first threshold, determine whether the first random number is smaller than the first threshold, determine to initiate the random access process when it is determined the first random number is smaller than the first threshold; and determine not to initiate the random access process when it is determined the first random number is larger than or equal to the first threshold.

16. The UE according to claim 14, wherein the instructions are executable by the at least one processor to:

generate a second random number, wherein before generating the TA message, determine whether the UE is to serve as a TA broadcasting device according to the second random number, generate the TA message according to the TA value when it is determined the UE is to serve as the TA broadcasting device, and determine not to generate the TA message when it is determined the UE is not to serve as the TA broadcasting device.

17. The UE according to claim 14, wherein the TA message comprises: a TA field, a hop count field, and a cell identifier field; and the instructions are executable by the at least one processor to:

add the TA value into the TA field of the generated TA message; generate a TA hop count and add the TA hop count into the hop count field of the generated TA message; and add an identifier of a cell where the UE resides into the cell identifier field of the generated TA message.

18. The UE according to claim 14, wherein the instructions are executable by the at least one processor to: repeatedly broadcast the generated TA message within a broadcast time window having a preconfigured time length.

19. The UE according to claim 14, the instructions are executable by the at least one processor to: before generating the TA message, determine to terminate the process when the TA value is obtained from a TA message received from another UE and a TA hop count in the received TA message is larger than or equal to a predetermined third threshold.

20. A Non-transitory computer readable storage medium, storing machine readable instructions executable by a processor to:

A, generate a first random number;

B, determine whether to initiate a random access process according to the first random number, obtain a timing advance (TA) value from a base station through a random access process when it is determined the random access process is to be initiated, monitor a TA message broadcast by another user terminal UE and obtain a TA value from the TA message when it is determined a random access process is not to be initiated;

C, perform uplink data transmission according to the TA value;

D, perform E when it is determined the uplink data transmission is successful; return to A when it is determined the uplink data transmission is unsuccessful; and E, generate a TA message according to the TA value, and broadcast the generated TA message.

* * * * *